US012636943B2

(12) United States Patent　　　　(10) Patent No.: US 12,636,943 B2
Chen et al.　　　　　　　　　　　　(45) Date of Patent: May 26, 2026

(54) VEHICLE WINDOW GLASS ASSEMBLY, VEHICLE, PREPARATION METHOD FOR VEHICLE WINDOW GLASS ASSEMBLY

(71) Applicant: FUYAO GLASS INDUSTRY GROUP CO., LTD., Fuqing (CN)

(72) Inventors: Zhao Chen, Fuqing (CN); Lixing Jiang, Fuqing (CN); Conglong Lin, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 0 days.

(21) Appl. No.: 18/634,297

(22) Filed: Apr. 12, 2024

(65) Prior Publication Data

US 2024/0253439 A1　　　Aug. 1, 2024

Related U.S. Application Data

(63) Continuation of application No. PCT/CN2021/125883, filed on Oct. 22, 2021.

(51) Int. Cl.
　　*B60J 10/78*　　　(2016.01)
　　*B60J 10/76*　　　(2016.01)
(52) U.S. Cl.
　　CPC ............... *B60J 10/76* (2016.02); *B60J 10/78* (2016.02)
(58) Field of Classification Search
　　CPC ..... B60J 10/78; B60J 10/76; B60J 1/10; B60J 1/17
　　See application file for complete search history.

(56) References Cited

U.S. PATENT DOCUMENTS

| | | | |
|---|---|---|---|
| 9,920,566 B1 * | 3/2018 | Bennett | E06B 3/5454 |
| 10,119,323 B2 * | 11/2018 | Lahnala | B60J 10/36 |
| 11,673,453 B2 * | 6/2023 | Takahashi | B60J 1/10 49/428 |

(Continued)

FOREIGN PATENT DOCUMENTS

| | | |
|---|---|---|
| CN | 102996021 A | 3/2013 |
| CN | 104742819 A | 7/2015 |

(Continued)

OTHER PUBLICATIONS

English translation of EP3785959 from WIPO (Year: 2019).*

(Continued)

*Primary Examiner* — Muhammad Ijaz
*Assistant Examiner* — Susan M. Heschel
(74) *Attorney, Agent, or Firm* — Scully, Scott, Murphy & Presser, P.C.

(57) ABSTRACT

A vehicle window glass assembly, a vehicle, and a preparation method for the vehicle window glass assembly are provided in the disclosure. The vehicle window glass assembly includes a guide profile, an exterior trim, a fixed glass sheet, and a connection member. The guide profile has a first side face and defines a fixing groove. An opening of the fixing groove is on the first side face. The exterior trim covers an outer surface of the guide profile. The fixed glass sheet includes a fixed portion at an edge of the fixed glass sheet. The fixed portion is received in the fixing groove. The connection member includes a first portion received in the fixing groove. The first portion is connected between a surface of the fixed portion and a groove wall of the fixing groove.

19 Claims, 8 Drawing Sheets

(56) References Cited

U.S. PATENT DOCUMENTS

| | | | | |
|---|---|---|---|---|
| 2010/0001550 A1* | 1/2010 | Janisch | .................... | B60J 10/78 |
| | | | | 296/146.2 |
| 2012/0167473 A1* | 7/2012 | Schapitz | .................. | B60J 10/30 |
| | | | | 49/431 |
| 2018/0118478 A1* | 5/2018 | Yamaguchi | ........ | G03G 15/6502 |
| 2020/0298690 A1 | 9/2020 | Yu et al. | | |

FOREIGN PATENT DOCUMENTS

| | | | | |
|---|---|---|---|---|
| CN | 106945493 A | 7/2017 | | |
| CN | 110901556 A | 3/2020 | | |
| CN | 113246696 A | 8/2021 | | |
| DE | 202010001223 U1 | 4/2010 | | |
| EP | 1843910 B1 | 6/2016 | | |
| EP | 3785959 A1 * | 3/2021 | .............. | B60J 10/16 |
| JP | H02179710 A | 7/1990 | | |
| JP | 04297320 A | 10/1992 | | |
| JP | 2001071752 A | 3/2001 | | |
| WO | 2019116818 A1 | 6/2019 | | |

OTHER PUBLICATIONS

Extended European search report dated Oct. 10, 2024 received in European Patent Application No. 21961095.3.

International Search Report dated Jul. 27, 2022 issued in PCT/CN2021/125883.

Notice of Reasons for Refusal issued in corresponding JP application No. 2024-522193 dated Jun. 25, 2025.

Notice of Reasons for Refusal issued in corresponding JP application No. 2024-522193 dated Nov. 10, 2025.

Notice of Submission of Opinion issued in corresponding KR application No. 10-2024-7012752 dated Jan. 19, 2026.

Examination Report issued in corresponding EP application No. 21961095.3 dated Apr. 9, 2026.

* cited by examiner

130

III——III

130

20          10

132

30

VEHICLE WINDOW GLASS ASSEMBLY, VEHICLE, PREPARATION METHOD FOR VEHICLE WINDOW GLASS ASSEMBLY

CROSS-REFERENCE TO RELATED APPLICATION

This application is a continuation of International Application No. PCT/CN2021/125883, filed on Oct. 22, 2021, and the entire disclosure of which is hereby incorporated by reference in its entirety.

TECHNICAL FIELD

The disclosure relates to the technical field of vehicles, and in particular, to a vehicle window glass assembly, a vehicle, and a preparation method for the vehicle window glass assembly.

BACKGROUND

With the continuous improvement of people's living standards, vehicles have become an important tool for transportation of family members, people have higher and higher requirements on the appearance of the vehicle, and a vehicle window glass assembly having a decorative function has become increasingly popular in vehicle exterior design. At present, an exterior trim is mainly used in the vehicle window glass assembly of a vehicle to achieve a decorative effect. However, cracks or even fractures easily occur between the exterior trim and a guide profile, as well as between the exterior trim and a connection member, which affects normal operation of the vehicle window glass assembly.

SUMMARY

Embodiments of the disclosure provide a vehicle window glass assembly, a vehicle, and a preparation method for the vehicle window glass assembly, to avoid cracks or fractures from easily occurring between an exterior trim and a guide profile, as well as from occurring between the exterior trim and a connection member, ensuring normal operation of the vehicle window glass assembly.

According to a first aspect, a vehicle window glass assembly includes a guide profile, an exterior trim, a fixed glass sheet, and a connection member. The guide profile has a first side face and defines a fixing groove. An opening of the fixing groove is on the first side face. The exterior trim covers an outer surface of the guide profile. The fixed glass sheet includes a fixed portion at an edge of the fixed glass sheet. The fixed portion is received in the fixing groove. The connection member includes a first portion received in the fixing groove. The first portion is connected between a surface of the fixed portion and a groove wall of the fixing groove. The exterior trim is made of a rim material, and the rim material has an elongation at break of greater than or equal to 10%.

In one embodiment, the exterior trim includes a main body and a first extension portion fixedly connected to the main body. The main body covers the outer surface of the guide profile. The first extension portion extends from one end of the main body to a periphery of the fixing groove and partially covers the first side face. The fixed glass sheet further includes an auxiliary portion fixedly connected to the fixed portion. The connection member further includes a second portion fixedly connected to the first portion. The second portion is connected between an outer surface of the auxiliary portion and one end face of the first extension portion.

In one embodiment, a side face of the second portion is flush with a side face of the first extension portion.

In one embodiment, the connection member further includes a third portion fixedly connected to the first portion. The third portion is connected to an inner surface of the auxiliary portion. The third portion partially covers the first side face and covers an inner surface of the guide profile.

In one embodiment, the vehicle window glass assembly further includes an interior trim covering an inner surface of the guide profile.

In one embodiment, the interior trim includes a first trim portion and a second trim portion fixedly connected to the first trim portion. The first trim portion covers the inner surface of the guide profile. The second trim portion extends from one end of the first trim portion to the periphery of the fixing groove and partially covers the first side face. The connection member further includes a third portion fixedly connected to the first portion. The third portion is connected between an inner surface of the auxiliary portion and one end face of the second trim portion.

In one embodiment, a side face of the third portion is flush with a side face of the second trim portion.

In one embodiment, the fixed glass sheet further includes an auxiliary portion fixedly connected to the fixed portion. The exterior trim includes a main body and a first extension portion connected to the main body. The main body covers the outer surface of the guide profile. The first extension portion extends from one end of the main body to an outer surface of the auxiliary portion. The first extension portion partially covers the first side face and covers one end face of the first portion.

In one embodiment, the rim material has an elongation at break of greater than or equal to 30%.

In one embodiment, the connection member further includes a third portion fixedly connected to the first portion, the third portion is connected to an inner surface of the auxiliary portion, and the third portion partially covers the first side face and covers an inner surface of the guide profile.

In one embodiment, the vehicle window glass assembly further includes an interior trim covering an inner surface of the guide profile.

In one embodiment, the interior trim includes a first trim portion and a second trim portion fixedly connected to the first trim portion. The first trim portion covers the inner surface of the guide profile. The second trim portion extends from one end of the first trim portion to an inner surface of the auxiliary portion. The second trim portion partially covers the first side face and covers the other end face of the first portion.

In one embodiment, the fixing groove extends through the outer surface of the guide profile. An outer surface of the fixed glass sheet is flush with an outer surface of the exterior trim, and one end face of the fixed portion abuts against the exterior trim.

In one embodiment, the rim material has an elongation at break of greater than or equal to 30%.

In one embodiment, the fixed glass sheet further includes an auxiliary portion fixedly connected to the fixed portion. The connection member further includes a third portion fixedly connected to the first portion. The third portion is connected to an inner surface of the auxiliary portion. The third portion partially covers the first side face and covers an inner surface of the guide profile.

In one embodiment, the vehicle window glass assembly further includes an interior trim covering an inner surface of the guide profile.

In one embodiment, the fixed glass sheet further includes an auxiliary portion fixedly connected to the fixed portion. The interior trim includes a first trim portion and a second trim portion fixedly connected to the first trim portion. The first trim portion covers the inner surface of the guide profile. The second trim portion extends from one end of the first trim portion to an inner surface of the auxiliary portion. The second trim portion partially covers the first side face and covers one end face of the first portion.

In one embodiment, a surface of the rim material has a pencil hardness ranging from 1H to 2H.

In one embodiment, the rim material has a grey scale of greater than or equal to 4 after being subject to 2000 hours of xenon lamp aging.

In one embodiment, the rim material has a gloss greater than or equal to 85.

In one embodiment, the rim material includes at least one of modified polymethyl methacrylate, modified nylon 6, modified nylon 66, modified polycarbonate, acrylonitrile butadiene styrene (ABS), polypropylene, polybutylene terephthalate, polyformaldehyde (POM), or acrylonitrile styrene acrylate copolymer (ASA).

In one embodiment, the guide profile is made of at least one of reinforced modified nylon 6, reinforced modified nylon 66, reinforced modified polycarbonate, reinforced polycarbonate, polymethyl methacrylate, or ASA.

In one embodiment, the connection member is made of a thermoplastic elastomer, polyvinyl chloride, ethylene propylene diene monomer, or polyurethane.

In one embodiment, the guide profile further includes a second side face opposite the first side face. The guide profile further defines a sliding groove. An opening of the sliding groove is on the second side face. The sliding groove is used for arrangement of a movable glass sheet.

In a second aspect, a vehicle is provided. The vehicle includes a door frame and the above vehicle window glass assembly provided in the first aspect. The vehicle window glass assembly is mounted to the door frame.

In a third aspect, a preparation method for a vehicle window glass assembly is provided. The preparation method includes the following. Form, through two-color injection molding, a composite structural member consisting of a guide profile and an exterior trim. Obtain the vehicle window glass assembly by placing the fixed glass sheet and the composite structural member into an injection mold and forming a connection member through injection molding.

In a fourth aspect, a preparation method for a vehicle window glass assembly is provided. The preparation method includes the following. Place a fixed glass sheet into an injection mold, and forming a guide profile through injection molding. Form a connection member through injection molding. Obtain the vehicle window glass assembly by forming an exterior trim through injection molding.

In the vehicle window glass assembly of the disclosure, the exterior trim is made of a rim material that has an elongation at break greater than or equal to 10%. This can avoid cracks or fractures from occurring between the exterior trim and the guide profile, as well as from occurring between the exterior trim and the connection member. In addition, the exterior trim can be in direct connection with the connection member without requiring the guide profile to be exposed for adhesion to the connection member. As a result, there is no stepped structure between the guide profile and the connection member, improving the aesthetic appearance of the vehicle window glass assembly.

BRIEF DESCRIPTION OF THE DRAWINGS

To describe technical solutions in embodiments of the disclosure or in the related art more clearly, the following briefly introduces the accompanying drawings required for describing the embodiments or the related art. Apparently, the accompanying drawings in the following description only illustrate some embodiments of the disclosure. Those of ordinary skill in the art may also obtain other drawings based on these accompanying drawings without creative efforts.

Reference numbers are described as follows:

100: vehicle, 110: door, 120: door frame, 130: vehicle window glass assembly, 131: vehicle window frame, 132: fixed glass sheet, 133: movable glass sheet, 134: fixed end of fixed glass sheet, 135: fixed portion of fixed end, 136: auxiliary portion of fixed end, 137: mounting end of movable glass sheet, 138: sealing strip, 10: guide profile, 20: exterior trim, 30: connection member, 40: interior trim, 101: inner surface of guide profile, 102: outer surface of guide profile, 103: first side face of guide profile, 104: second side face of guide profile, 105: fixing groove of guide profile, 106:

sliding groove of guide profile, 11: main body of guide profile, 12: first side wall of guide profile, 13: second side wall of guide profile, 14: third side wall of guide profile, 15: fourth side wall of guide profile, 201: outer surface of exterior trim, 21: main body of exterior trim, 22: first extension portion of exterior trim, 221: side face of first extension portion, 23: second extension portion of exterior trim, 31: first portion of connection member, 32: second portion of connection member, 321: side face of second portion, 33: third portion of connection member, 331: side face of third portion, 401: inner surface of interior trim, 41: first trim portion of interior trim, 42: second trim portion of interior trim, 421: side face of second trim portion, 43: third trim portion of interior trim, 200: composite structural member, 300: mold, 16: first boss, 17: second boss.

DETAILED DESCRIPTION

The following describes embodiments of the disclosure with reference to the accompanying drawings in the embodiments of the disclosure.

Figure 1:
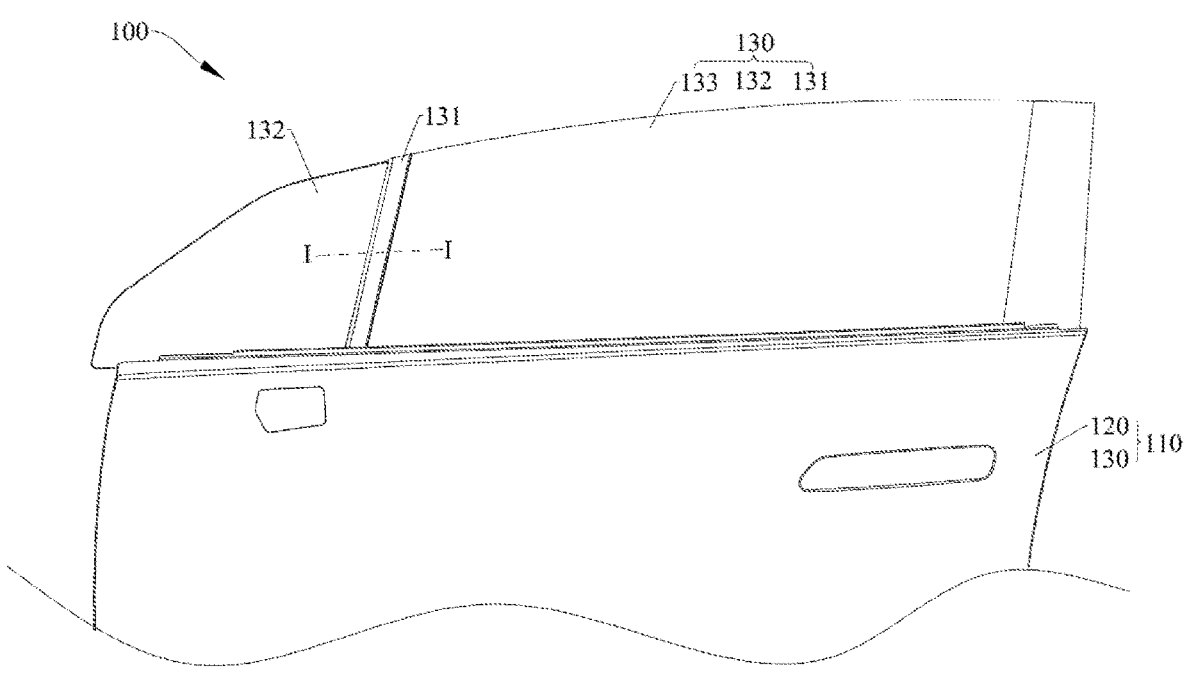
FIG. 1 is a schematic partial structural view of a vehicle provided in embodiments of the disclosure.

Referring to FIG. 1, FIG. 1 is a schematic partial structural view of a vehicle 100 provided in the embodiments of the disclosure. FIG. 1 only illustrates a door 110 of the vehicle 100.

Embodiments of the disclosure provide a vehicle 100. The vehicle 100 includes a door 110. The door 110 includes a door frame 120 and a vehicle window glass assembly 130. The vehicle window glass assembly 130 is mounted to the door frame 120. Exemplarily, a front door of the vehicle 100 is taken as an example of the door 110 of the vehicle 100 illustrated in FIG. 1. In other embodiments, the vehicle window glass assembly 130 illustrated in the embodiments of the disclosure is also applicable to a rear door of the vehicle 100, which will not be limited herein.

Figure 2:
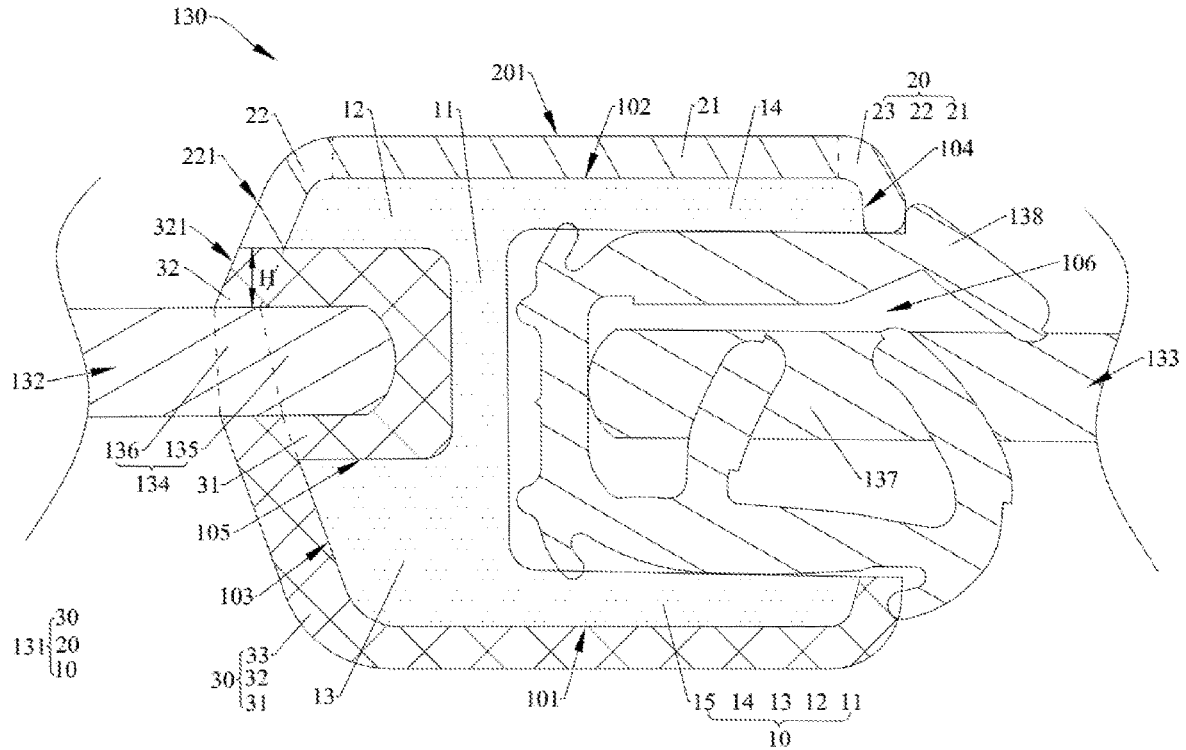
FIG. 2 is a schematic cross-sectional view of a vehicle window glass assembly in FIG. 1 in an embodiment, taken along line I-I.

Referring to FIG. 2, FIG. 2 is a schematic cross-sectional view of the vehicle window glass assembly 130 in FIG. 1 in an embodiment, taken along line I-I. Here, "taken along line I-I" refers to cut along a plane where line I-I is located, and the following related illustrations can be understood in the same way.

The vehicle window glass assembly 130 includes a vehicle window frame 131, a fixed glass sheet 132, and a movable glass sheet 133. The fixed glass sheet 132 is mounted at one side of the vehicle window frame 131 and is fixed relative to the vehicle window frame 131. The movable glass sheet 133 is mounted at the other side of the vehicle window frame 131 and is movable relative to the vehicle window frame 131.

The vehicle window frame 131 includes a guide profile 10, an exterior trim 20, and a connection member 30. Both the exterior trim 20 and the connection member 30 can be integrally formed with the guide profile 10 through injection molding. In the embodiments, the guide profile 10 is in an "I" shape. The guide profile 10 includes an inner surface 101, an outer surface 102, a first side face 103, and a second side face 104. The inner surface 101 and the outer surface 102 are disposed opposite to each other. The first side face 103 and the second side face 104 are disposed opposite to each other. The first side face 103 and the second side face 104 are both connected between the inner surface 101 and the outer surface 102. The guide profile 10 defines a fixing groove 105 and a sliding groove 106. An opening of the fixing groove 105 is on the first side face 103. The fixing groove 105 extends from the first side face 103 towards the second side face 104. An opening of the sliding groove 106 is on the second side face 104. The sliding groove 106 extends from the second side face 104 towards the first side face 103. Exemplarily, both the fixing groove 105 and the sliding groove 106 are U-shaped.

It may be noted that, directional terms such as "inside" and "outside" involved in the disclosure are described with reference to an interior environment and an exterior environment of the vehicle 100. The term "inside" refers to a direction towards the interior of the vehicle 100, and the term "outside" refers to a direction towards the exterior of the vehicle 100. These terms do not indicate or imply that devices or components referred to must have a certain orientation or be constructed and operated in a specific orientation, and therefore cannot be construed as limitations to the disclosure.

In an embodiment, the guide profile 10 includes a main body 11, a first side wall 12, a second side wall 13, a third side wall 14, and a fourth side wall 15. The first side wall 12 is opposite to and spaced apart from the second side wall 13. Both the first side wall 12 and the second side wall 13 are connected to one side of the main body 11. The main body 11, the first side wall 12, and the second side wall 13 cooperatively define the fixing groove 105. The third side wall 14 is opposite to and spaced apart from the fourth side wall 15. Both the third side wall 14 and the fourth side wall 15 are connected to the other side of the main body 11. The main body 11, the third side wall 14, and the fourth side wall 15 cooperatively define the sliding groove 106.

The main body 11, the first side wall 12, the second side wall 13, the third side wall 14, and the fourth side wall 15 are integrally formed. The guide profile 10 may be made of at least one of reinforced modified nylon 6, reinforced modified nylon 66, reinforced modified polycarbonate, reinforced polycarbonate, polymethyl methacrylate, or acrylonitrile styrene acrylate copolymer (ASA). Exemplarily, the guide profile 10 may be made of reinforced modified nylon 6 (PA6, nylon 6), reinforced modified nylon 66 (PA66, nylon 66), or reinforced modified polycarbonate (PC). Alternatively, the guide profile 10 may be made of reinforced polycarbonate, polymethyl methacrylate (PMMA), and the ASA.

The exterior trim 20 covers the outer surface 102 of the guide profile 10 to serve as a trim for the appearance of the vehicle window glass assembly 130, thereby improving the aesthetic appearance of the vehicle 100. The exterior trim 20 includes an outer surface 201 away from the guide profile 10. The outer surface 201 of the exterior trim 20 can present surface effects such as high gloss, matte, texture, or different colors, thereby enriching the appearance effect of the vehicle window glass assembly 130 and improving the aesthetic appearance of the vehicle 100.

In the embodiments, the exterior trim 20 further partially covers the first side face 103 and the second side face 104. Specifically, the exterior trim 20 includes a main body 21, a first extension portion 22, and a second extension portion 23. The first extension portion 22 and the second extension portion 23 are fixedly connected to two opposite sides of the main body 21, respectively. The main body 21 covers the outer surface 102 of the guide profile 10. The first extension portion 22 extends from one end of the main body 21 to a periphery of the fixing groove 105 and partially covers the first side face 103. The first extension portion 22 includes a side face 221 away from the guide profile 10. The second extension portion 23 extends from the other end of the main body 21 to a periphery of the sliding groove 106 and partially covers the second side face 104.

The main body 21, the first extension portion 22, and the second extension portion 23 are integrally formed. The exterior trim 20 is made of a rim material. The rim material has an elongation at break of greater than or equal to 10%. Moreover, a surface of the rim material has a pencil hardness ranging from 1H to 2H to satisfy scratch resistance requirements of the exterior trim 20. H is a pencil hardness unit. Furthermore, the rim material has a grey scale of greater than or equal to 4 after being subject to 2000 hours of xenon lamp aging, to satisfy weathering resistance requirements of the exterior trim 20. The material is applied outdoors to undergo a weathering test, such as comprehensive damage caused by light, cold and heat, wind and rain, bacteria, etc. The ability of the material to withstand such weather test is referred to as weather resistance. Furthermore, the rim material has a gloss greater than or equal to 85 to ensure that the surface of the exterior trim 20 remains shiny, thereby improving the aesthetic appearance of the vehicle window glass assembly 130.

The rim material may include at least one of modified polymethyl methacrylate, modified nylon 6, modified nylon 66, modified polycarbonate, acrylonitrile butadiene styrene (ABS), polypropylene, polybutylene terephthalate, polyformaldehyde (POM), or ASA. Exemplarily, the rim material may be modified polymethyl methacrylate, modified nylon 6, modified nylon 66, modified polycarbonate, ABS, polypropylene (PP), polybutylene terephthalate (PBT), or POM. Alternatively, the rim material may be a composite of modified polymethyl methacrylate and ASA. Alternatively, the rim material may be a composite of polycarbonate, polymethyl methacrylate, and ASA.

The fixed glass sheet 132 includes a fixed end 134. The fixed end 134 is at one end of the fixed glass sheet 132. The fixed end 134 includes a fixed portion 135 and an auxiliary portion 136 fixedly connected to the fixed portion 135. The fixed portion 135 is accommodated in the fixing groove 105. The auxiliary portion 136 extends outwards relative to the fixing groove 105.

The connection member 30 is mounted in the fixing groove 105 and is connected to the guide profile 10, the exterior trim 20, and the fixed end 134 of the fixed glass sheet 132, thereby achieving a connection between the guide profile 10 and the fixed glass sheet 132 and a connection between the exterior trim 20 and the fixed glass sheet 132. In the embodiments, the connection member 30 includes a first portion 31, a second portion 32, and a third portion 33. The first portion 31 is U-shaped. The second portion 32 is fixedly connected to one end of the first portion 31. The third portion 33 is fixedly connected to the other end of the first portion 31.

Specifically, the first portion 31 of the connection member 30 is received in the fixing groove 105. The first portion 31 is connected between a surface of the fixed portion 135 of the fixed end 134 and a groove wall of the fixing groove 105. The first portion 31 of the connection member 30 is filled between the surface of the fixed portion 135 of the fixed end 134 and the groove wall of the fixing groove 105, to achieve a connection between the fixed glass sheet 132 and the guide profile 10. The second portion 32 of the connection member 30 protrudes relative to the fixing groove 105 and is connected between an end face of the first extension portion 22 and an outer surface of the auxiliary portion 136, to achieve a connection between the fixed glass sheet 132 and the exterior trim 20. The second portion 32 of the connection member 30 includes a side face 321 away from the first portion 31. In this case, a distance H between the exterior trim 20 and the fixed glass sheet 132 is greater than 0 mm.

In the embodiments, the exterior trim 20 and the fixed glass sheet 132 are closely adhered to each other to form a complete whole through adhesive properties of the guide profile 10 and the connection member 30, thereby ensuring the overall strength and sealing performance of the vehicle window glass assembly 130. In addition, the elongation at break of the rim material is greater than or equal to 10%, thereby avoiding cracks or fractures from occurring between the exterior trim 20 and the guide profile 10, as well as from occurring between the exterior trim 20 and the connection member 30. The exterior trim 20 can be in direct connection with the connection member 30 without requiring the guide profile 10 to be exposed for adhesion to the connection member. As a result, there is no stepped structure between the guide profile 10 and the connection member 30, improving the aesthetic appearance of the vehicle window glass assembly 130. Furthermore, the second portion 32 of the connection member 30 is connected between the fixed glass sheet 132 and the exterior trim 20, and may also serve as a cushion, thereby further avoiding cracks or fractures from occurring between the exterior trim 20 and the guide profile 10, as well as from occurring between the exterior trim 20 and the connection member 30.

Furthermore, a side face 321 of the second portion 32 of the connection member 30 is flush with a side face 221 of the first extension portion 22 of the exterior trim 20. That is, the side face 321 of the second portion 32 of the connection member 30 is coplanar with the side face 221 of the first extension portion 22 of the exterior trim 20. As a result, there is no significant difference between a boundary of the connection member 30 and a boundary of the exterior trim 20. When the vehicle window glass assembly 130 is viewed from the exterior of the vehicle 100, the connection member 30 and the exterior trim 20 can be approximated to be an integrated structure, and the vehicle window glass assembly 130 has an aesthetically pleasing and simple appearance, improving the aesthetic appearance of the vehicle 100.

The third portion 33 of the connection member 30 is substantially "L"-shaped. The third portion 33 of the connection member 30 protrudes relative to the fixing groove 105 and is connected to an inner surface of the auxiliary portion 136 of the fixed end 134. In the embodiments, the third portion 33 extends from the inner surface of the auxiliary portion 136 along an edge of the guide profile 10 to the periphery of the sliding groove 106. The third portion 33 of the connection member 30 partially covers the first side face 103, covers the inner surface 101, and partially covers the second side face 104.

The first portion 31, the second portion 32, and the third portion 33 of the connection member 30 are integrally formed. Exemplarily, the connection member 30 may be made of a thermoplastic elastomer (TPE), polyvinyl chloride (PVC), ethylene propylene diene monomer (EPDM), or polyurethane (PU).

The movable glass sheet 133 includes a mounting end 137. The mounting end 137 is slidably mounted in the sliding groove 106 and slidable within the sliding groove 106. In addition, the vehicle window glass assembly 130 further includes a sealing strip 138. The mounting end 137 of the movable glass sheet 133 is mounted in the sliding groove 106 through the sealing strip 138. In the embodiments, the guide profile 10 defines the sliding groove 106, and thus there is no need to assemble the guide profile 10 and the exterior trim 20 to form the sliding groove 106 through mechanical clipping or snap-fitting. This eliminates the risk of detachment of the exterior trim 20 and ensures the strength of the sliding groove 106, thereby increasing the structural reliability of the sliding groove 106.

Figure 3:
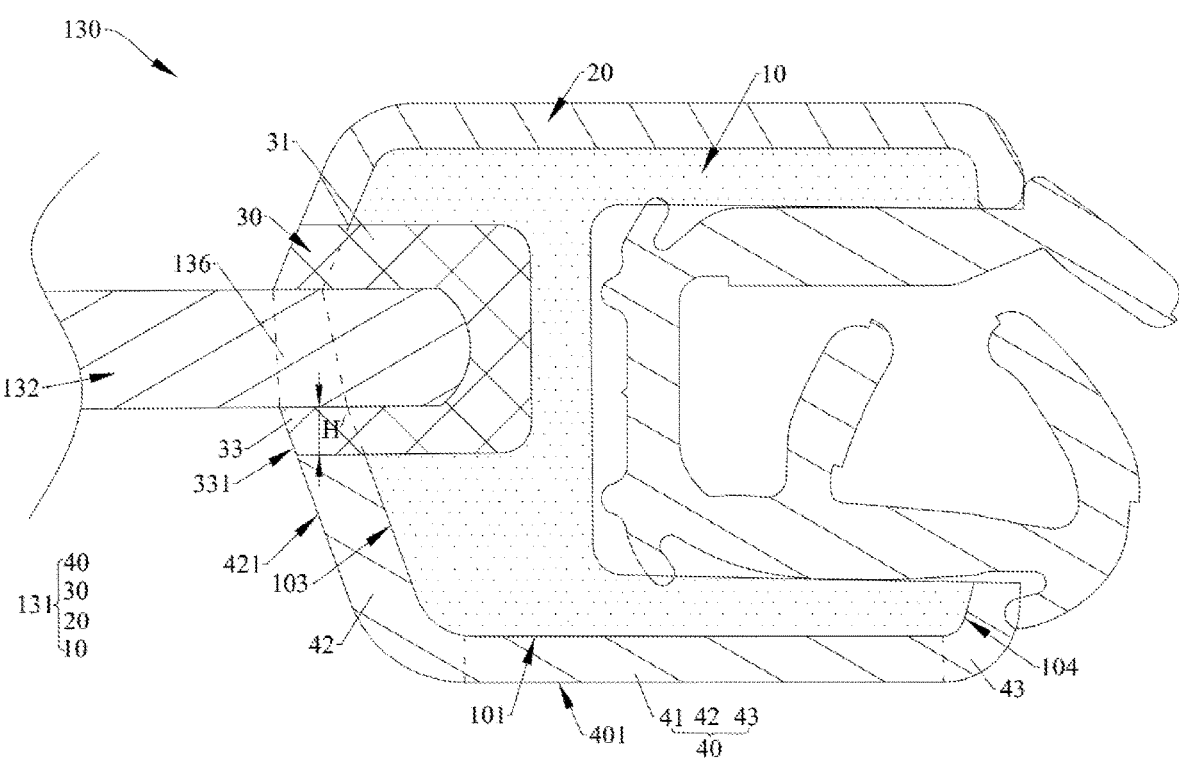
FIG. 3 is a schematic cross-sectional view of a vehicle window glass assembly in FIG. 1 in an embodiment, taken along line I-I.

Referring to FIGS. 1 and 3, FIG. 3 is a schematic cross-sectional view of the vehicle window glass assembly 130 in FIG. 1, taken along line I-I. In FIG. 3, the movable glass sheet 133 of the vehicle window glass assembly 130 is omitted.

The vehicle window glass assembly 130 includes the vehicle window frame 131, the fixed glass sheet 132, and the movable glass sheet 133. The fixed glass sheet 132 is mounted at one side of the vehicle window frame 131 and is fixed relative to the vehicle window frame 131. The movable glass sheet 133 is mounted at the other side of the vehicle window frame 131 and is movable relative to the vehicle window frame 131. The vehicle window frame 131 includes the guide profile 10, the exterior trim 20, and the connection member 30. Both the exterior trim 20 and connection member 30 can be integrally formed with the guide profile 10 through injection molding.

The vehicle window glass assembly 130 illustrated in FIG. 3 is substantially the same as the vehicle window glass assembly 130 illustrated in FIG. 2 except the following. The vehicle window frame 131 in FIG. 3 further includes the interior trim 40. The interior trim 40 may be integrally formed with the guide profile 10 through injection molding. The interior trim 40 covers the inner surface 101 of the guide profile 10 to serve as an interior trim of the vehicle window glass assembly 130, improving the interior aesthetics of the vehicle 100. The interior trim 40 includes an inner surface 401 away from the guide profile 10. The inner surface 401 of the interior trim 40 can present surface effects such as high gloss, matte, texture, or different colors, thereby improving the interior aesthetics of the vehicle window glass assembly 130.

In addition, the interior trim 40 further partially covers the first side face 103 and the second side face 104. The interior trim 40 includes a first trim portion 41, a second trim portion 42, and a third trim portion 43. The second trim portion 42 and the third trim portion 43 are fixedly connected to two opposite sides of the first trim portion 41, respectively. The first trim portion 41 covers the inner surface 101 of the guide profile 10. The second trim portion 42 extends from one end of the first trim portion 41 to the periphery of the fixing groove 105 and partially covers the first side face 103. The second trim portion 42 includes a side surface 421 that faces away from the guide profile 10. The third trim portion 43 extends from the other end of the first trim portion 41 to the periphery of the sliding groove 106 and partially covers the second side face 104. The first trim portion 41, the second trim portion 42, and the third trim portion 43 are integrally formed. It may be noted that, material properties of the interior trim 40 may be the same as material properties of the exterior trim 20, and the material properties of the interior trim 40 may refer to the material properties of the exterior trim 20 in FIG. 2, which will not be repeated herein.

In the embodiments, the third portion 33 of the connection member 30 protrudes relative to the fixing groove 105 and is connected between one end face of the second trim portion 42 of the interior trim 40 and the inner surface of the auxiliary portion 136 of the fixed end 134, to achieve a connection between the fixed glass sheet 132 and the interior trim 40. The third portion 33 of the connection member 30 includes a side face 331 away from the first portion 31. In this case, a distance H' between the interior trim 40 and fixed glass sheet 132 is greater than 0 mm.

Furthermore, the side face 331 of the third portion 33 of the connection member 30 is flush with a side face 421 of the second trim portion 42 of the interior trim 40. That is, the side face 331 of the third portion 33 of the connection member 30 is coplanar with the side face 421 of the second trim portion 42 of the interior trim 40. As a result, there is no significant difference between a boundary of the connection member 30 and a boundary of the interior trim 40. When the vehicle window glass assembly 130 is viewed from the exterior of the vehicle 100, the connection member 30 and the interior trim 40 can be approximated to be an integrated structure, and internal structures of the vehicle window glass assembly 130 have an aesthetically pleasing and simple appearance, improving the interior aesthetics of the vehicle 100.

It may be noted that, other structures of the vehicle window glass assembly 130 illustrated in FIG. 3 are substantially the same as other structures of the vehicle window glass assembly 130 illustrated in FIG. 2. The other structures of the vehicle window glass assembly 130 in FIG. 3 may refer to the foregoing illustrations, which will not be repeated herein.

Figure 4:
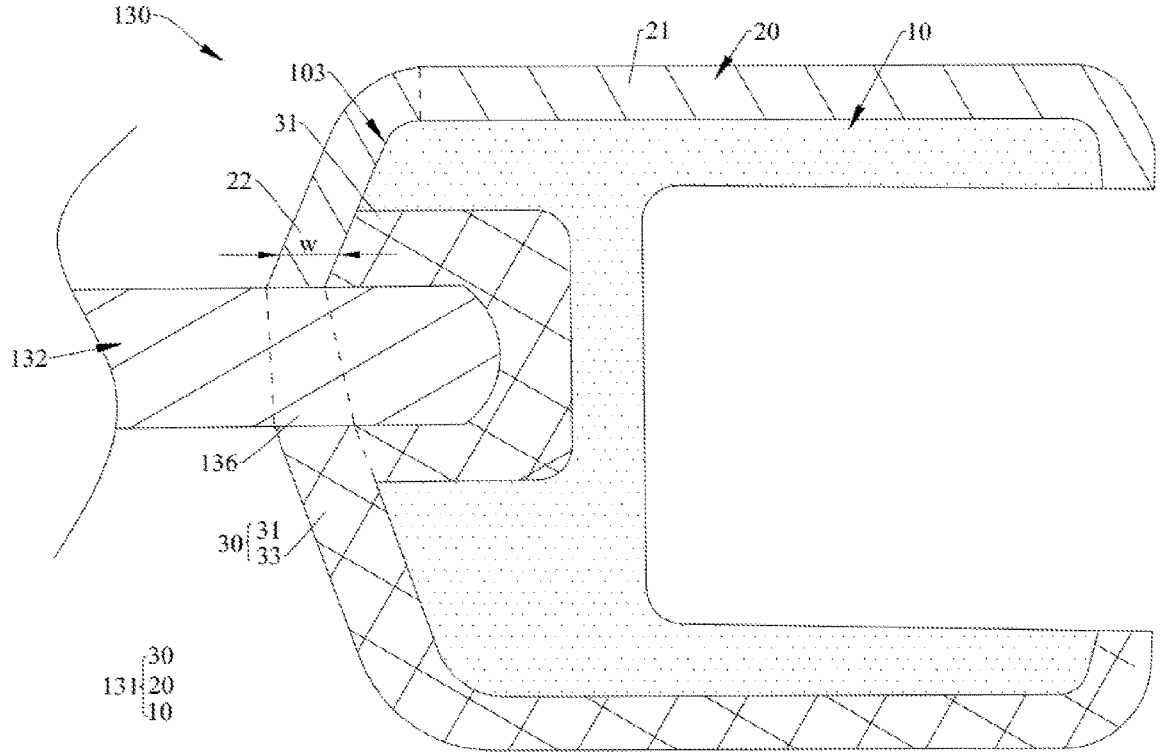
FIG. 4 is a schematic cross-sectional view of a vehicle window glass assembly in FIG. 1 in an embodiment, taken along line I-I.

Referring to FIGS. 1 and 4, FIG. 4 is a schematic cross-sectional view of the vehicle window glass assembly 130 in FIG. 1 in an embodiment, taken along line I-I. In FIG. 4, the movable glass sheet 133 of the vehicle window glass assembly 130 is omitted.

The vehicle window glass assembly 130 includes the vehicle window frame 131, the fixed glass sheet 132, and the movable glass sheet 133. The fixed glass sheet 132 is mounted at one side of the vehicle window frame 131 and is fixed relative to the vehicle window frame 131. The movable glass sheet 133 is mounted at the other side of the vehicle window frame 131 and is movable relative to the vehicle window frame 131. The vehicle window frame 131 includes the guide profile 10, the exterior trim 20, and the connection member 30. Both the exterior trim 20 and the connection member 30 may be integrally formed with the guide profile 10 through injection molding.

The vehicle window glass assembly 130 illustrated in FIG. 4 is substantially the same as the vehicle window glass assembly 130 illustrated in FIG. 2 except the following. The connection member 30 includes the first portion 31 and the third portion 33 fixedly connected to the first portion 31. The first extension portion 22 of the exterior trim 20 extends from one end of the main body 21 to the outer surface of the auxiliary portion 136. The first extension portion 22 partially covers the first side face 103 and covers one end face of the first portion 31 of the connection member 30. One end face of the first extension portion 22 abuts against the outer surface of the auxiliary portion 136. In this case, a distance between the exterior trim 20 and the fixed glass sheet 132 is equal to zero. That is, the exterior trim 20 is in direct contact with the fixed glass sheet 132. This results in a glossy fit between the exterior trim 20 and the fixed glass sheet 132, thereby enhancing simplicity and aesthetics of the appearance of the vehicle window glass assembly 130, and improving the aesthetic appearance of the vehicle 100. In addition, the first extension portion 22 of the exterior trim 20 has a thickness w of greater than 0 mm and less than or equal to 5 mm. Exemplarily, the first extension portion 22 has the thickness w ranging from 0.5 mm to 5 mm.

In the embodiments, the elongation at break of the rim material of the exterior trim 20 is greater than or equal to 30%, which can avoid cracks or fractures from occurring between the exterior trim 20 and the guide profile 10, as well as from occurring between the exterior trim 20 and the connection member 30, thereby improving the operational reliability of the vehicle window glass assembly 130. Moreover, due to the higher elongation at break of the rim material, there is no need for the buffer provided by the second portion 32 of the connection member 30 illustrated in the FIG. 2. This allows the exterior trim 20 to be in direct contact with the fixed glass sheet 132, thus no crack or fracture will occur between the exterior trim 20 and the guide profile 10, as well as between the exterior trim 20 and the connection member 30.

It may be noted that, other structures of the vehicle window glass assembly 130 illustrated in FIG. 4 are substantially the same as the other structures of the vehicle window glass assembly 130 illustrated in FIG. 2. The other structures of the vehicle window glass assembly 130 in FIG. 4 may refer to the foregoing illustrations, which will not be repeated herein.

Figure 5:
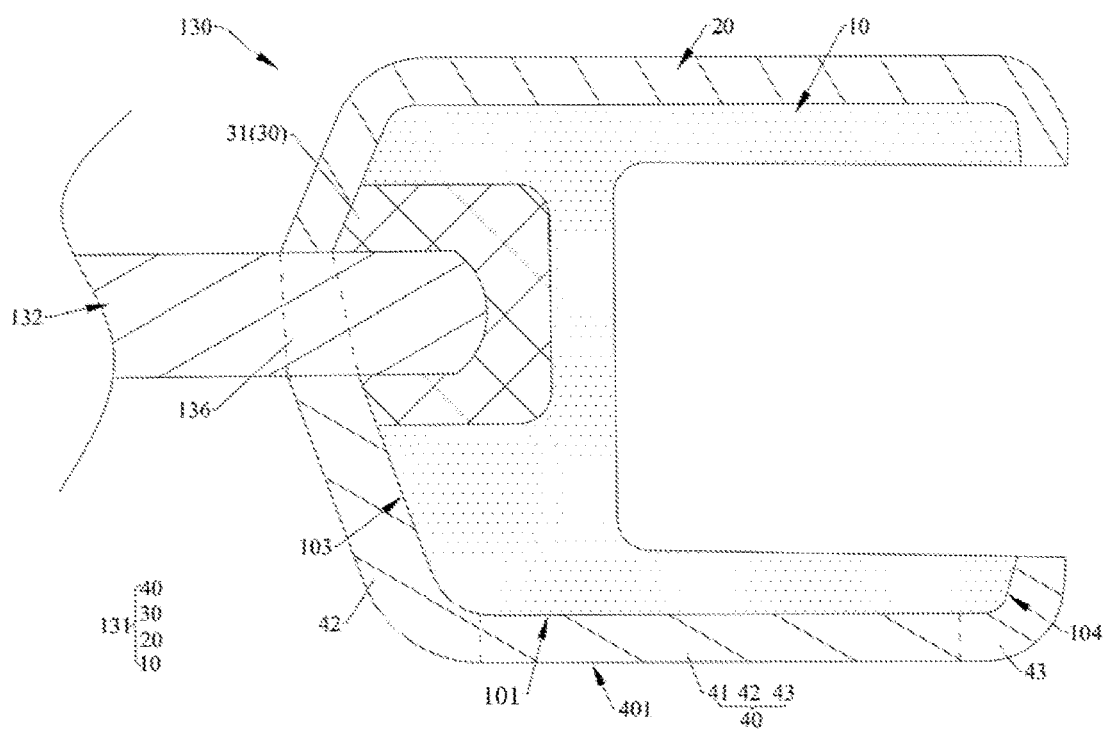
FIG. 5 is a schematic cross-sectional view of a vehicle window glass assembly in FIG. 1 in an embodiment, taken along line I-I.

Referring to FIGS. 1 and 5, FIG. 5 is a schematic cross-sectional view of the vehicle window glass assembly 130 in FIG. 1 in an embodiment, taken along line I-I. In FIG. 5, the movable glass sheet 133 of the vehicle window glass assembly 130 is omitted.

The vehicle window glass assembly 130 includes the vehicle window frame 131, the fixed glass sheet 132, and the movable glass sheet 133. The fixed glass sheet 132 is mounted at one side of the vehicle window frame 131 and is fixed relative to the vehicle window frame 131. The movable glass sheet 133 is mounted at the other side of the vehicle window frame 131 and is movable relative to the vehicle window frame 131. The vehicle window frame 131 includes the guide profile 10, the exterior trim 20, and the connection member 30. Both the exterior trim 20 and the connection member 30 can be integrally formed with the guide profile 10 through injection molding.

The vehicle window glass assembly 130 illustrated in FIG. 5 is substantially the same as the vehicle window glass assembly 130 illustrated in FIG. 4. The connection member 30 includes the first portion 31. The vehicle window frame 131 further includes the interior trim 40. The interior trim 40 may be integrally formed with the guide profile 10 through injection molding. The interior trim 40 covers the inner surface 101 of the guide profile 10 to serve as an interior trim of the vehicle window glass assembly 130, improving the interior aesthetics of the vehicle 100. The interior trim 40 includes the inner surface 401 away from the guide profile 10. The inner surface 401 of the interior trim 40 can present surface effects such as high gloss, matte, texture, or different colors, thereby improving the interior aesthetics of the vehicle window glass assembly 130.

In addition, the interior trim 40 further partially covers the first side face 103 and the second side face 104 and covers the other end face of the first portion 31. The interior trim 40 includes the first trim portion 41, the second trim portion 42, and the third trim portion 43. The second trim portion 42 and the third trim portion 43 are fixedly connected to two opposite sides of the first trim portion 41, respectively. The first trim portion 41 covers the inner surface 101 of the guide profile 10. The second trim portion 42 extends from one end of the first trim portion 41 to the inner surface of the auxiliary portion 136. The second trim portion 42 partially covers the first side face 103 and the other end face of the first portion 31. The third trim portion 43 extends from the other end of the first trim portion 41 to the periphery of the sliding groove 106 and partially covers the second side face 104. It may be noted that, the material properties of the interior trim 40 illustrated in FIG. 5 may be the same as the material properties of the interior trim 40 illustrated in FIG. 3. Therefore, the material properties of the interior trim 40 illustrated in FIG. 5 may refer to the material properties of the interior trim 40 in FIG. 3, which will not be repeated herein.

It may be understood that, other structures of the vehicle window glass assembly 130 illustrated in FIG. 5 are substantially the same as the other structures of the vehicle window glass assembly 130 illustrated in FIG. 4. The other structures of the vehicle window glass assembly 130 in FIG. 5 may refer to the foregoing illustrations, which will not be repeated herein.

Figure 6:
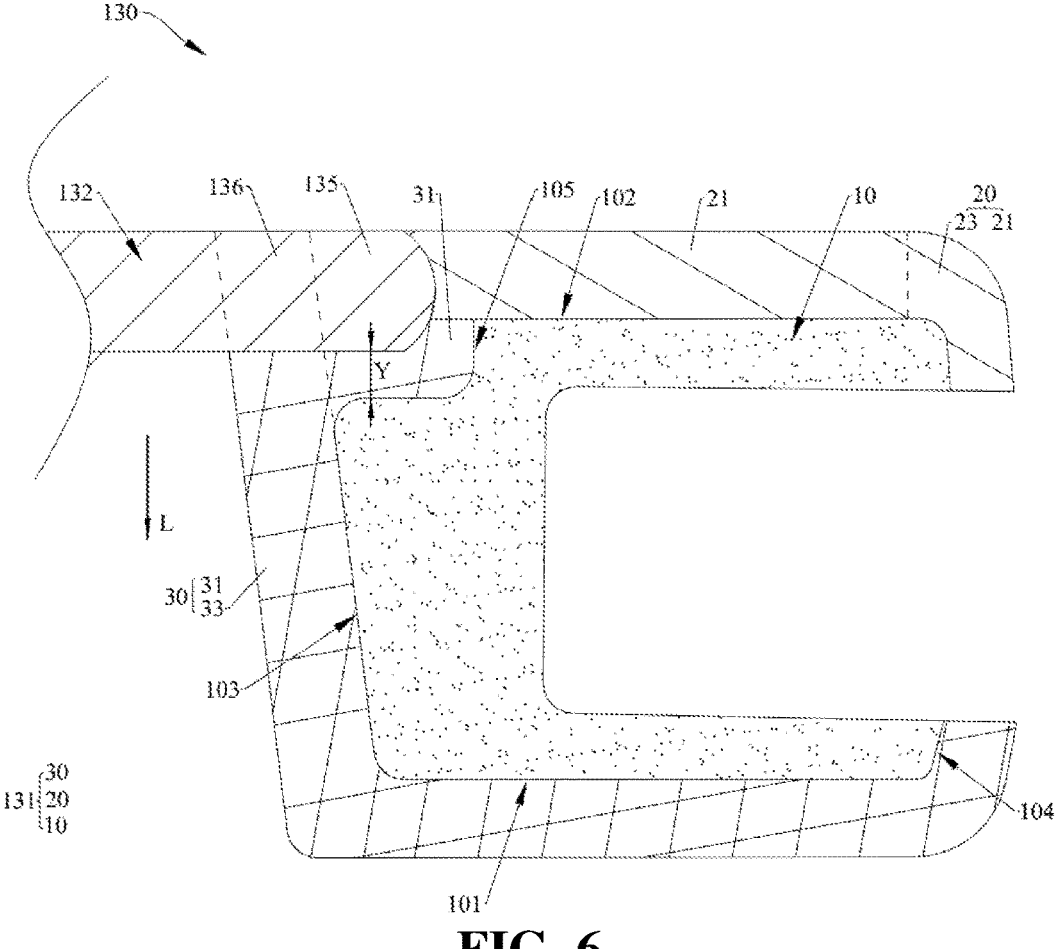
FIG. 6 is a schematic cross-sectional view of a vehicle window glass assembly in FIG. 1 in a fifth embodiment, taken along line I-I.

Referring to FIGS. 1 and 6, FIG. 6 is a schematic cross-sectional view of the vehicle window glass assembly 130 in FIG. 1 in a fifth embodiment, taken along line I-I. In FIG. 6, the movable glass sheet 133 of the vehicle window glass assembly 130 is omitted.

The vehicle window glass assembly 130 includes the vehicle window frame 131, the fixed glass sheet 132, and the movable glass sheet 133. The fixed glass sheet 132 is mounted at one side of the vehicle window frame 131 and is fixed relative to the vehicle window frame 131. The movable glass sheet 133 is mounted at the other side of the vehicle window frame 131 and is movable relative to the vehicle window frame 131. The vehicle window frame 131 includes the guide profile 10, the exterior trim 20, and the connection member 30. Both the exterior trim 20 and the connection member 30 can be integrally formed with the guide profile 10 through injection molding.

The vehicle window glass assembly 130 illustrated in FIG. 6 is substantially the same as the vehicle window glass assembly 130 illustrated in FIG. 2 except the following. The fixing groove 105 extends through the outer surface 102 of the guide profile 10. The exterior trim 20 covers the outer surface 102 of the guide profile 10 and partially covers the second side face 104. Specifically, the exterior trim 20 includes the main body 21 and the second extension portion 23. The second extension portion 23 is fixedly connected to the other end of the main body 21. The main body 21 covers the outer surface 102 of the guide profile 10. The second extension portion 23 extends from the other end of the main body 21 to the periphery of the sliding groove 106, and partially covers the second side face 104.

The fixed portion 135 of the fixed end 134 of the fixed glass sheet 132 is received in the fixing groove 105. One end face of the fixed portion 135 abuts against the exterior trim 20. The one end face of the fixed portion 135 abuts one end of the main body 21 away from the second extension portion 23. In addition, an outer surface of the fixed glass sheet 132 is flush with the outer surface 201 of the exterior trim 20. When viewed from the exterior of the vehicle 100, the fixed glass sheet 132 and the exterior trim 20 are in direct connection with each other, and there is no visible boundary between the fixed glass sheet 132 and the exterior trim 20, so that the vehicle window glass assembly 130 has a more aesthetically pleasing and simple appearance, improving the aesthetic appearance of the vehicle 100.

In the embodiments, the connection member 30 includes the first portion 31 and the third portion 33. The first portion 31 is received in the fixing groove 105, and is connected between the surface of the fixed portion 135 of the fixed end 134 and the groove wall of the fixing groove 105. The first portion 31 is filled between the surface of the fixed portion 135 and the groove wall of the fixing groove 105, thereby achieving a connection between the fixed glass sheet 132 and the guide profile 10. In addition, the first portion 31 is also filled between an inner surface of the exterior trim 20 and the groove wall of the fixing groove 105, thereby achieving a connection among the fixed glass sheet 132, the exterior trim 20, and the guide profile 10. A distance Y between the fixed glass sheet 132 and the guide profile 10 ranges from 0 mm to 2 mm.

In this case, the fixed glass sheet 132 is partially overlapped with the guide profile 10 in a direction from an outer side to an inner side of the vehicle window glass assembly 130 (i.e., in L-direction indicated in FIG. 6). Here, the guide profile 10 and the connection member 30 may support the fixed glass sheet 132 together, ensuring that the fixed glass sheet 132 does not experience bending in a direction perpendicular to L-direction. In addition, the connection member 30 may also provide a sealing function, ensuring the overall strength and the sealing performance of the vehicle window glass assembly 130.

The third portion 33 of the connection member 30 is substantially L-shaped. The third portion 33 of the connection member 30 extends relative to the fixing groove 105 and is connected to the inner surface of the auxiliary portion 136 of the fixed end 134. In the embodiments, the third portion 33 extends from the inner surface of the auxiliary portion 136 along the edge of the guide profile 10 to the periphery of the sliding groove 106. The third portion 33 of the connection member 30 partially covers the first side face 103, covers the inner surface 101, and partially covers the second side face 104.

It may be noted that, other structures of the vehicle window glass assembly 130 illustrated in FIG. 6 are substantially the same as the other structures of the vehicle window glass assembly 130 illustrated in FIG. 2. The other structures of the vehicle window glass assembly 130 may refer to the foregoing illustrations, which will not be repeated herein.

Figure 7:
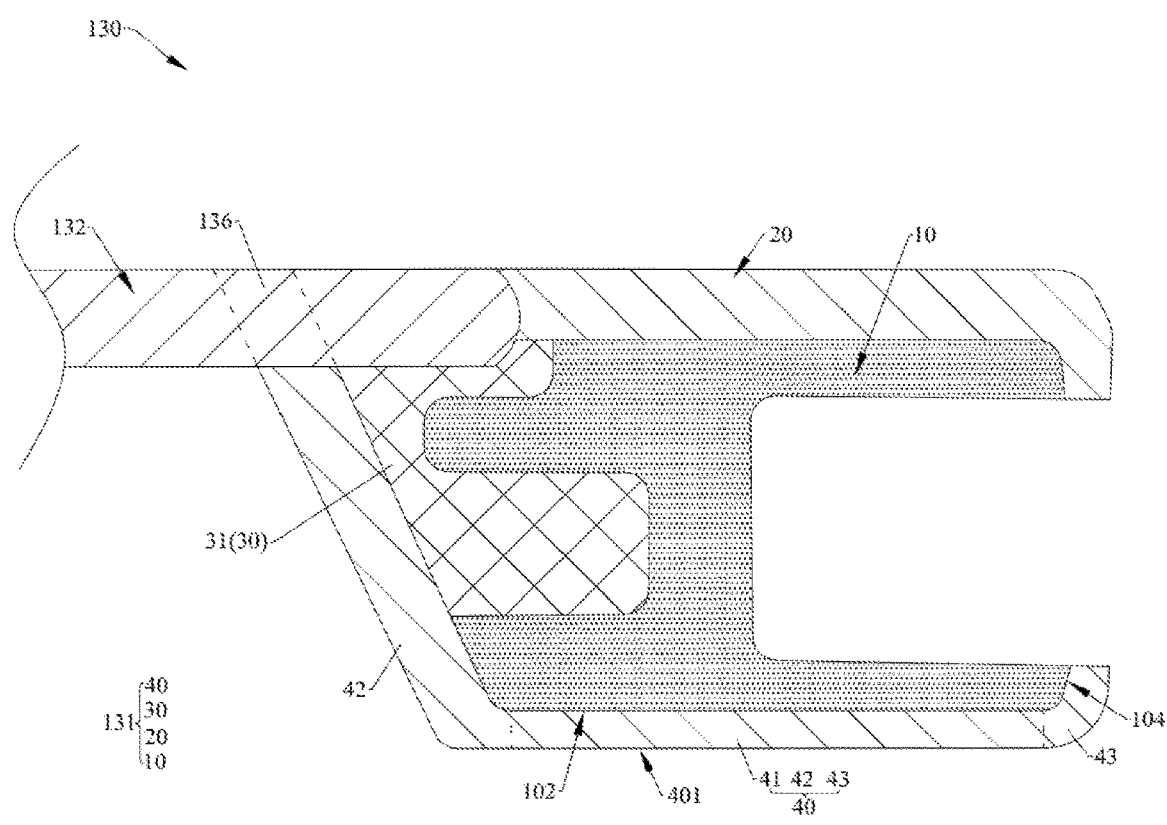
FIG. 7 is a schematic cross-sectional view of a vehicle window glass assembly in FIG. 1 in a sixth embodiment, taken along line I-I.

Referring to FIGS. 1 and 7, FIG. 7 is a schematic cross-sectional view of the vehicle window glass assembly 130 in FIG. 1 in a sixth embodiment, taken along line I-I. In FIG. 7, the movable glass sheet 133 of the vehicle window glass assembly 130 is omitted.

The vehicle window glass assembly 130 includes the vehicle window frame 131, the fixed glass sheet 132, and the movable glass sheet 133. The fixed glass sheet 132 is mounted at one side of the vehicle window frame 131 and is fixed relative to the vehicle window frame 131. The movable glass sheet 133 is mounted at the other side of the vehicle window frame 131 and is movable relative to the vehicle window frame 131. The vehicle window frame 131 includes the guide profile 10, the exterior trim 20, and the connection member 30. Both the exterior trim 20 and the connection member 30 can be integrally formed with the guide profile 10 through injection molding.

The vehicle window glass assembly 130 illustrated in FIG. 7 is substantially the same as the vehicle window glass assembly 130 illustrated in FIG. 6 except the following. The connection member 30 includes the first portion 31. The vehicle window frame 131 further includes the interior trim 40. The interior trim 40 may be integrally formed with the guide profile 10 through injection molding. The interior trim 40 covers the inner surface 101 of the guide profile 10 to serve as an interior trim of the vehicle window glass assembly 130, improving the interior aesthetics of the vehicle 100. The interior trim 40 includes the inner surface 401 away from the guide profile 10. The inner surface 401 of the interior trim 40 can present surface effects such as gloss light, matte, texture, or different colors, improving the interior aesthetics of the vehicle window glass assembly 130.

In addition, the interior trim 40 further partially covers the first side face 103 and the second side face 104, and covers the end face of the first portion 31. The interior trim 40 includes the first trim portion 41, the second trim portion 42, and the third trim portion 43. The second trim portion 42 and the third trim portion 43 are fixedly connected to two opposite sides of the first trim portion 41, respectively. The first trim portion 41 covers the inner surface 101 of the guide profile 10. The second trim portion 42 extends from one end of the first trim portion 41 to the inner surface of the auxiliary portion 136. The second trim portion 42 partially covers the first side face 103 and covers the end face of the first portion 31. The third trim portion 43 extends from the other end of the first trim portion 41 to the periphery of the sliding groove 106 and partially covers the second side face 104. It may be noted that, the material properties of the interior trim 40 illustrated in FIG. 7 may be the same as the material properties of the interior trim 40 illustrated in FIG. 3. Therefore, the material properties of the interior trim 40 illustrated in FIG. 7 may refer to the material properties of the interior trim 40 illustrated in FIG. 3, which will not be repeated herein.

It may be understood that, other structures of the vehicle window glass assembly 130 illustrated in FIG. 7 are substantially the same as the other structures of the vehicle window glass assembly 130 illustrated in FIG. 6. The other structures of the vehicle window glass assembly 130 may refer to the foregoing illustrations, which will not be repeated herein.

The embodiments of the disclosure further provide a preparation method for the vehicle window glass assembly 130 illustrated in any one of FIGS. 2 to 7.

The preparation method for the vehicle window glass assembly 130 according to the embodiments of the disclosure will be described by taking the vehicle window glass assembly 130 illustrated in FIG. 2 as an example. The preparation method for the vehicle window glass assembly 130 includes the following.

Figure 8:
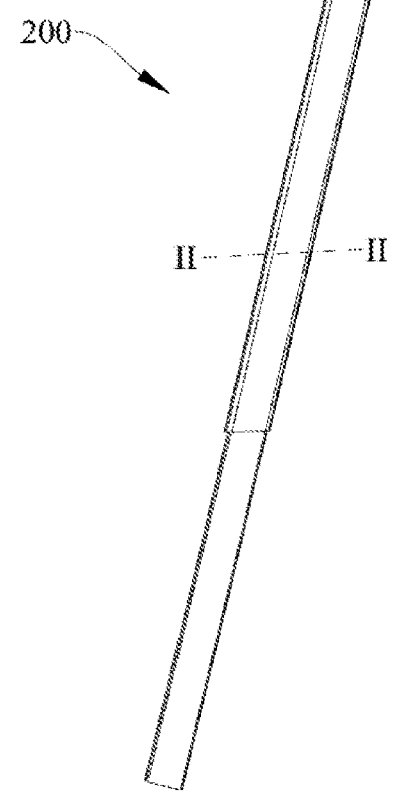
FIG. 8 is a schematic structural view of a composite structural member prepared in a preparation method for a vehicle window glass assembly provided in embodiments of the disclosure.
Figure 9:
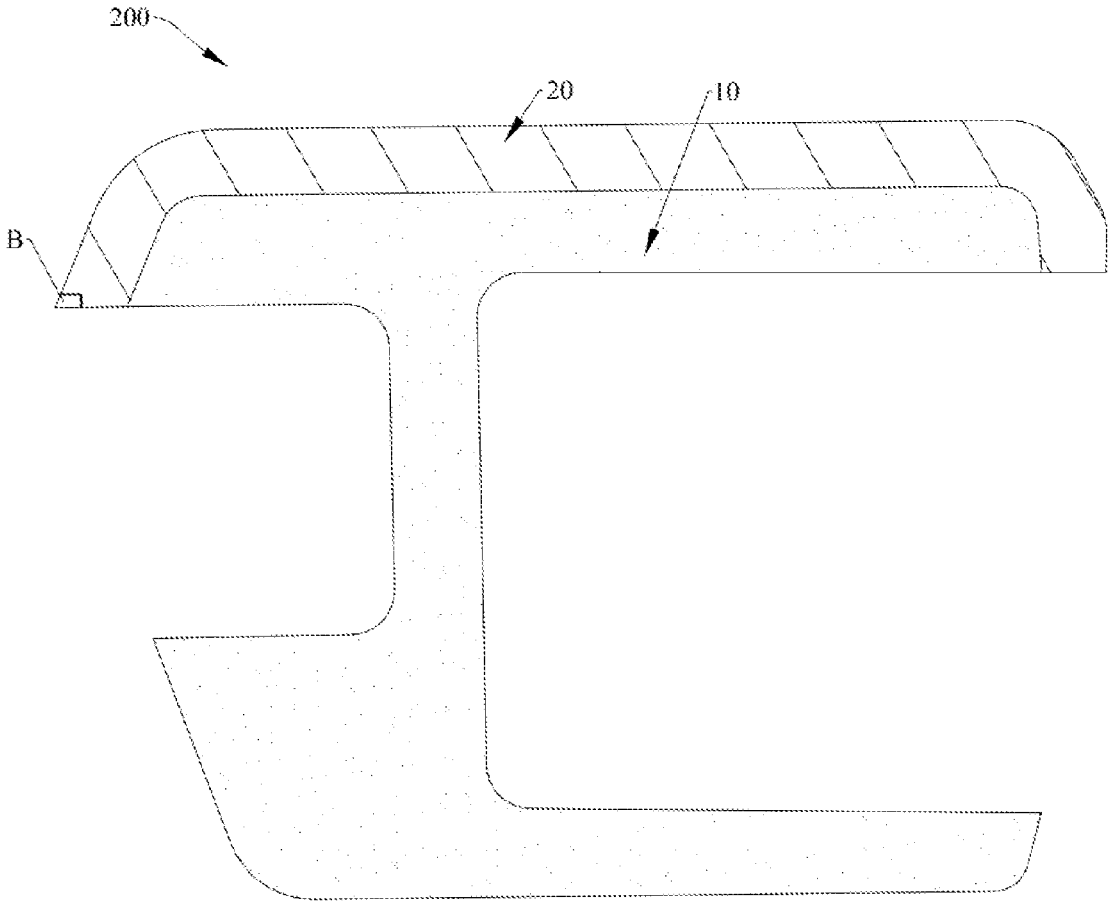
FIG. 9 is a schematic cross-sectional view of the composite structural member in FIG. 8, taken along line II-II.

At S1, form, through two-color injection molding, a composite structural member 200 consisting of a guide profile 10 and an exterior trim 20. As illustrated in FIGS. 8 and 9, the composite structural member 200 includes the guide profile 10 and the exterior trim 20. The guide profile 10 and the exterior trim 20 in FIG. 9 have the same structures as the guide profile 10 and the exterior trim 20 illustrated in FIG. 2, respectively.

Figure 10:
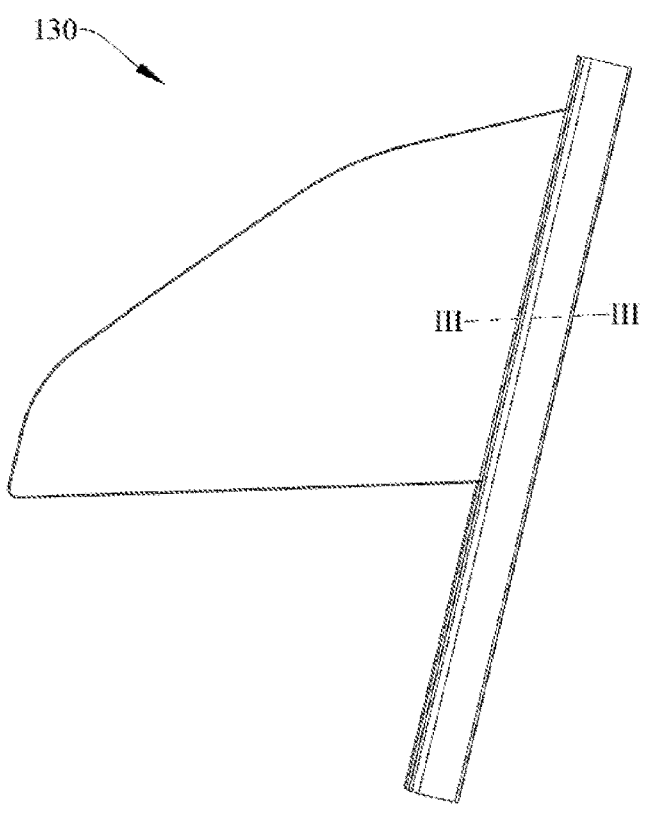
FIG. 10 is a schematic structural view of a vehicle window glass assembly prepared in the preparation method for a vehicle window glass assembly provided in embodiments of the disclosure.
Figure 11:
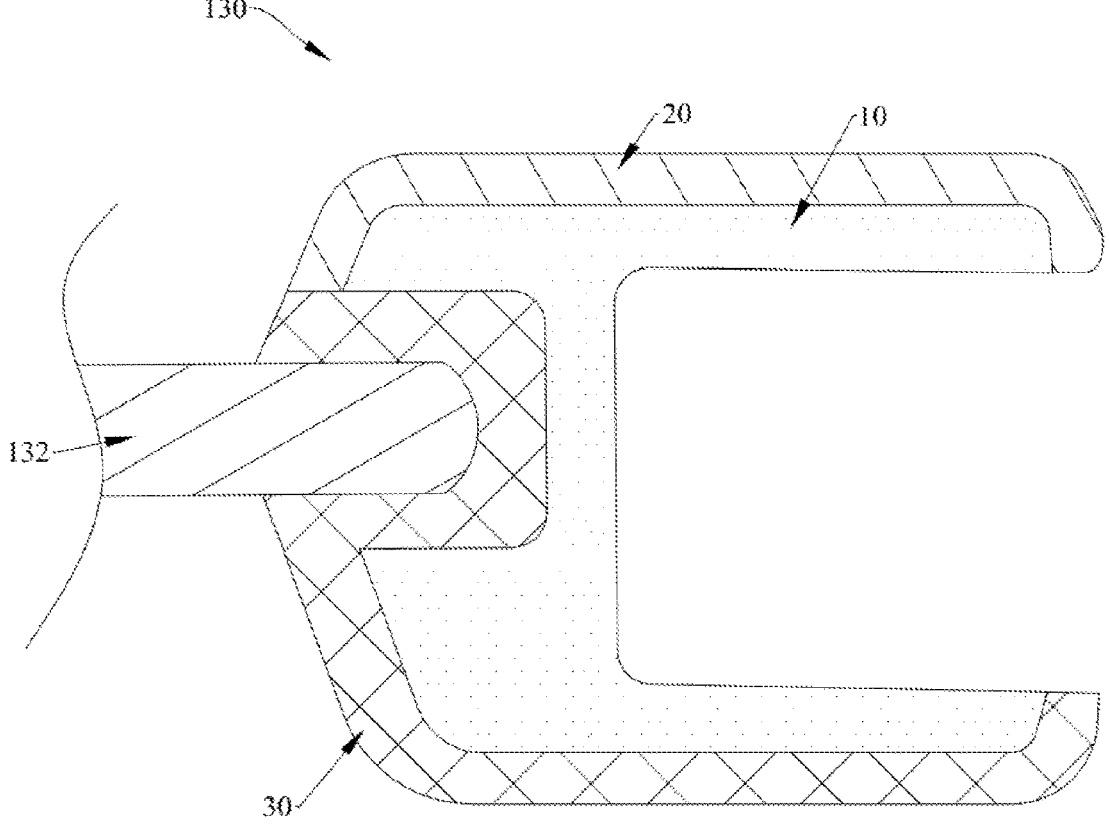
FIG. 11 is a schematic cross-sectional view of the vehicle window glass assembly in FIG. 10, taken along line III-III.

At S2, obtain the vehicle window glass assembly 130 by placing the fixed glass sheet 132 and the composite structural member 200 into an injection mold and forming a connection member 30 through injection molding. As illustrated in FIGS. 10 and 11, the vehicle window glass assembly 130 includes the guide profile 10, the exterior trim 20, the connection member 30, and the fixed glass sheet 132. The connection member 30 and the fixed glass sheet 132 in FIG. 11 have the same structures as the connection member 30 and the fixed glass sheet 132 in FIG. 2, respectively.

Figure 12:
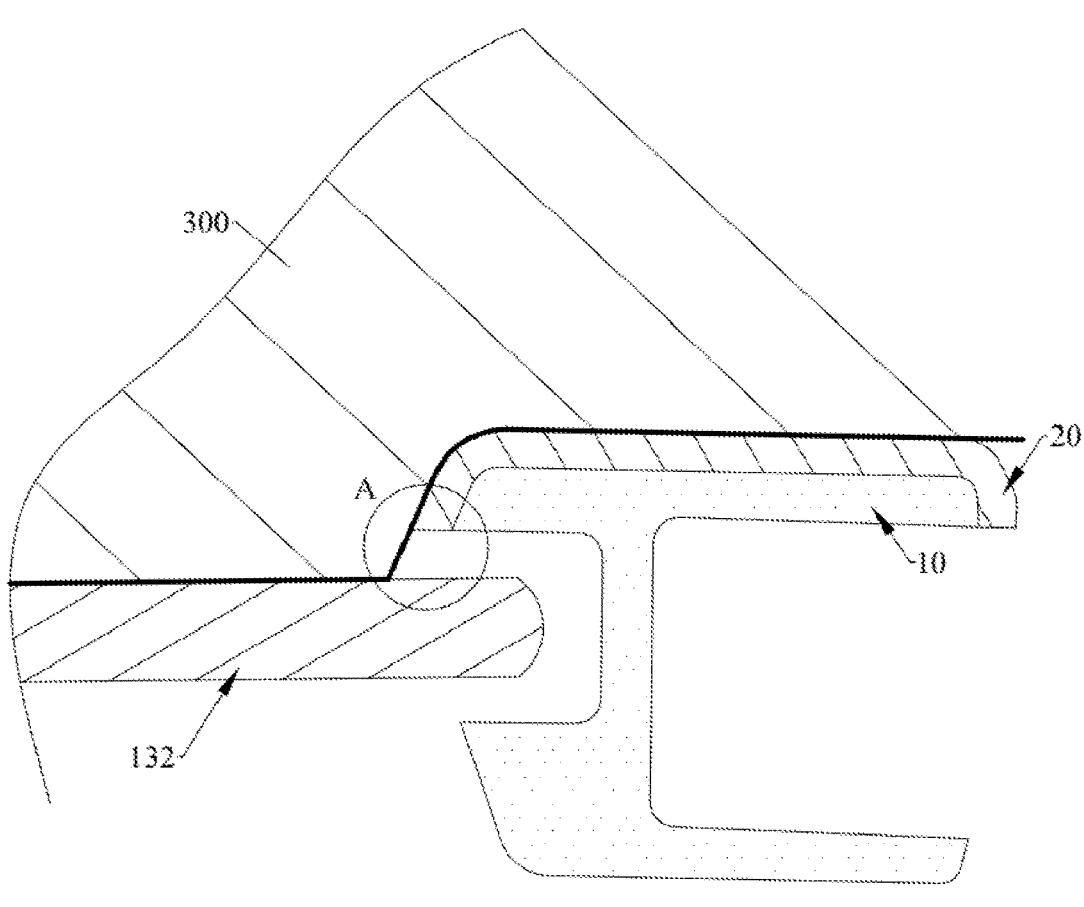
FIG. 12 is a schematic cross-sectional view illustrating injection molding of a connection member in a preparation method for the first vehicle window glass assembly provided in embodiments of the disclosure.

It may be noted that, as illustrated in FIG. 12, since the distance H between the exterior trim 20 and the fixed glass sheet 132 is greater than 0 mm, an edge of the exterior trim 20 is located at a position of a parting line. During injection molding of the exterior trim 20, unavoidable step or burr defects may occur at the edge of the exterior trim 20. Additionally, there may be deviations in the contour of the edge of the exterior trim 20, resulting in weaker edge strength. During injection molding of the connection member 30, there is a gap between the exterior trim 20 and the fixed glass sheet 132 (as indicated by circle A in FIG. 12), causing the exterior trim 20 to be in a suspended state relative to the fixed glass sheet 132. As a result, the mold 300 is unable to compact the exterior trim 20, and the injection pressure will act on the edge of the exterior trim 20 (i.e., at position B indicated in FIG. 9), resulting in overflow, flash, or wave defects in the final formed connection member 30.

It may be understood that, in a case where the preparation method for the vehicle window glass assembly 130 in this embodiment is used to prepare the vehicle window glass assembly 130 in any one of FIGS. 4 to 7, the exterior trim 20 is in direct contact with the fixed glass sheet 132. During injection molding of the connection member 30, there is no gap between the exterior trim 20 and the fixed glass sheet 132, allowing a mold cavity to compact the exterior trim 20 and the fixed glass sheet 132 to achieve a sealing effect. The connection member 30 is formed in an inner cavity of a product, avoiding overflow, flash, or wave defects, resulting in improvements in the product quality and the product competitiveness of the vehicle window glass assembly 130. In particular, in the vehicle window glass assembly 130 illustrated in FIG. 6 and the vehicle window glass assembly 130 illustrated in FIG. 7, since there is no gap between the exterior trim 20 and the fixed glass sheet 132, the connection member 30 is not exposed, which can avoid wave defects at a boundary between the connection member 30 and the exterior trim 20, further improving the aesthetic appearance of the vehicle window glass assembly 130.

In the preparation method for the vehicle window glass assembly 130 according to the embodiments, the guide profile 10 and the exterior trim 20 are first formed through two-color injection molding, where the guide profile 10 and the exterior trim 20 may form an integrated structure. The guide profile 10 defines the sliding groove 106 (as illustrated in FIG. 2) to meet space requirements of the movable glass sheet 133 (as illustrated in FIG. 2). Then, the composite structural member 200 and the fixed glass sheet 132 are placed in a connection member assembly mold, the composite structural member 200 (as an attachment) and the fixed glass sheet 132 are used for integrally injection molding of the connection member, finally forming the vehicle window glass assembly 130.

The preparation method for the vehicle window glass assembly 130 in the embodiments can effectively reduce the production procedures of the vehicle window glass assembly 130, simplify the technological process, improve the efficiency, and reduce product costs. Furthermore, the guide profile 10 and the exterior trim 20 are formed through two-color injection molding, so that the adhesion between the guide profile 10 and the exterior trim 20 is good, eliminating the risk of detachment or pull-out of the exterior trim 20. Moreover, there is no gap between the guide profile 10 and the exterior trim 20. As a result, in a case where the vehicle window glass assembly 130 is mounted to the door frame 120, water leakage and noise issues can be prevented, enhancing the sealing of the vehicle window glass assembly 130.

Furthermore, through two-color injection molding and integral injection molding of the connection member, the guide profile 10, the exterior trim 20, and the connection member 30 can be integrally formed. This not only strengthens the overall integrity of the vehicle window glass assembly 130, but also allows the gap between the exterior trim 20 and the fixed glass sheet 132 to be infinitely reduced, resulting in less exposed area of the connection member 30 and better integrity of the appearance the vehicle window glass assembly 130. In addition, the appearance effect of the vehicle window glass assembly 130 can also be enriched to improve the aesthetic appearance of the vehicle window glass assembly 130, and the interior trim 40 (as illustrated in FIG. 3) can also be disposed on an inner side of the guide profile 10 to enrich the interior aesthetics of the vehicle window glass assembly 130.

The embodiments of the disclosure further provide a preparation method for the vehicle window glass assembly 130 illustrated in any one of FIGS. 2 to 7.

The preparation method for the vehicle window glass assembly 130 according to the embodiments of the disclosure will be described by taking the vehicle window glass assembly 130 in FIG. 4 as an example. The preparation method for the vehicle window glass assembly 130 includes the following.

At S1, place the fixed glass sheet 132 into an injection mold.

Step S2, form the guide profile 10 through injection molding.

Step S3, form the connection member 30 through injection molding.

Step S4, obtain the vehicle window glass assembly 130 by forming the exterior trim 20 through injection molding.

Figure 13:
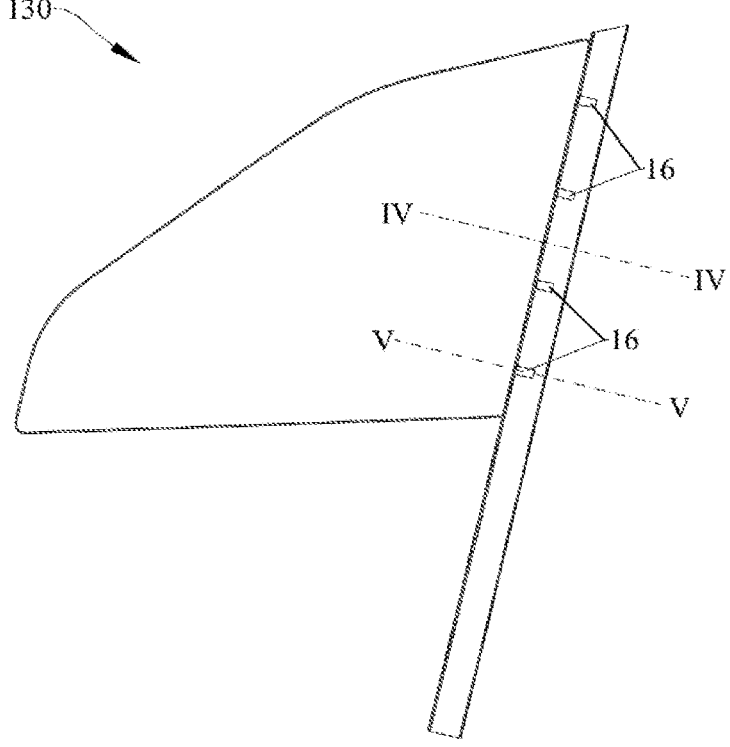
FIG. 13 is a schematic structural view of a vehicle window glass assembly prepared in a preparation method for a vehicle window glass assembly provided in embodiments of the disclosure.
Figure 14:
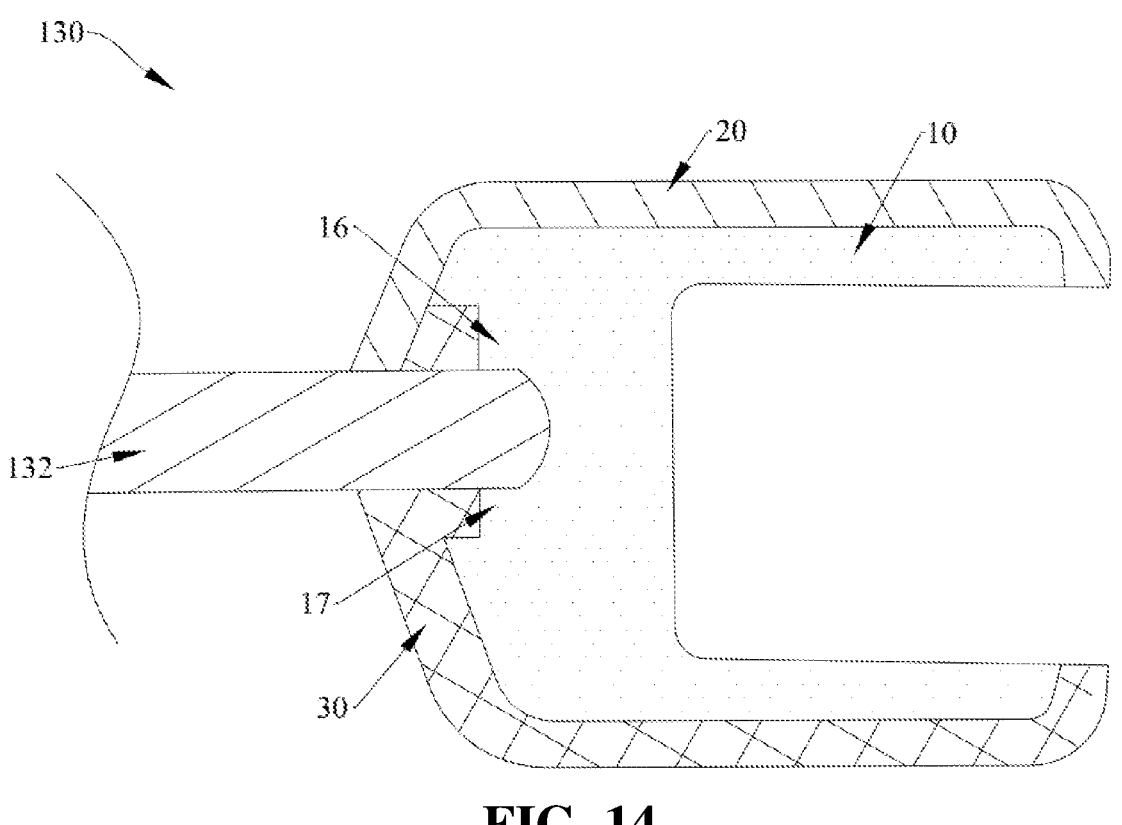
FIG. 14 is a schematic cross-sectional view of the vehicle window glass assembly in FIG. 13, taken along line V-V.

As illustrated in FIGS. 13 and 14, the vehicle window glass assembly 130 includes the guide profile 10, the exterior trim 20, the connection member 30, and the fixed glass sheet 132. FIG. 14 is a schematic cross-sectional view of the vehicle window glass assembly 130 in FIG. 13, taken along line V-V. At S2, the guide profile 10 is formed through injection molding, multiple first bosses 16 and multiple second bosses 17 for supporting the fixed glass sheet 132 are formed on the inner side of the guide profile 10. The first bosses 16 and the second bosses 17 can support and fix the fixed glass sheet 132 during forming of the connection member 30 and the exterior trim 20 through injection molding, thereby enhancing the molding accuracy and improving the product quality of the vehicle window glass assembly 130.

It may be noted that, in some other embodiments, after the guide profile 10 is formed through the injection molding at S2, it is possible to directly proceed to S4 to form the exterior trim 20 through injection molding, and then the connection member 30 can be mounted through bonding. Alternatively, after the guide profile 10 is formed through injection molding at S2, it is possible to proceed to S4 to form the exterior trim through injection molding, and then S3 can be carried out to form the connection member 30 through injection molding.

While the disclosure has been described in detail above with reference to the exemplary embodiments, the scope of the disclosure is not limited thereto. As will occur to those skilled in the art, the disclosure is susceptible to various modifications and changes without departing from the scope of the disclosure. Therefore, the scope of the disclosure should be determined by the scope of the claims.

What is claimed is:

1. A vehicle window glass assembly, comprising a guide profile, an exterior trim, a fixed glass sheet, and a connection member, wherein the guide profile has a first side face and defines a fixing groove, an opening of the fixing groove is on the first side face, the exterior trim covers an outer surface of the guide profile, the fixed glass sheet comprises a fixed portion at an edge of the fixed glass sheet, the fixed portion is received in the fixing groove, the connection member comprises a first portion received in the fixing groove, and the first portion is connected between a surface of the fixed portion and a groove wall of the fixing groove;

wherein the exterior trim is made of a material, and the material has an elongation at break of greater than or equal to 10%; and wherein the exterior trim is in direct contact with each of the fixed glass sheet, the guide profile, and the connection member.

2. The vehicle window glass assembly of claim 1, wherein the fixed glass sheet further comprises an auxiliary portion fixedly connected to the fixed portion, the exterior trim comprises a main body and a first extension portion connected to the main body, the main body covers the outer surface of the guide profile, the first extension portion extends from one end of the main body to an outer surface of the auxiliary portion, and the first extension portion partially covers the first side face and covers one end face of the first portion.

3. The vehicle window glass assembly of claim 2, wherein the material has an elongation at break of greater than or equal to 30%.

4. The vehicle window glass assembly of claim 2, wherein the connection member further comprises a second portion fixedly connected to the first portion, the second portion is connected to an inner surface of the auxiliary portion, and the second portion partially covers the first side face and covers an inner surface of the guide profile.

5. The vehicle window glass assembly of claim 2, further comprising an interior trim covering an inner surface of the guide profile.

6. The vehicle window glass assembly of claim 5, wherein the interior trim comprises a first trim portion and a second trim portion fixedly connected to the first trim portion, the first trim portion covers the inner surface of the guide profile, and the second trim portion extends from one end of the first trim portion to an inner surface of the auxiliary portion, and the second trim portion partially covers the first side face and covers the other end face of the first portion.

7. The vehicle window glass assembly of claim 6, wherein the guide profile further has a second side face, the inner surface and the outer surface are disposed opposite to each other, the first side face and the second side face are disposed opposite to each other, and the first side face and the second side face are both connected between the inner surface and the outer surface.

8. The vehicle window glass assembly of claim 7, wherein the interior trim further comprises a third trim portion, the second trim portion and the third trim portion are fixedly connected to two opposite sides of the first trim portion, respectively, and the third trim portion extends from the other end of the first trim portion to a periphery of a sliding groove and partially covers the second side face of the guide profile.

9. The vehicle window glass assembly of claim 5, wherein the interior trim is integrally formed with the guide profile through injection molding.

10. The vehicle window glass assembly of claim 1, wherein the fixing groove extends through the outer surface of the guide profile, an outer surface of the fixed glass sheet is flush with an outer surface of the exterior trim, and one end face of the fixed portion abuts against the exterior trim.

11. The vehicle window glass assembly of claim 10, wherein the material has an elongation at break of greater than or equal to 30%.

12. The vehicle window glass assembly of claim 10, wherein the fixed glass sheet further comprises an auxiliary portion fixedly connected to the fixed portion, the connection member further comprises a second portion fixedly connected to the first portion, the second portion is connected to an inner surface of the auxiliary portion, and the second portion partially covers the first side face and covers an inner surface of the guide profile.

13. The vehicle window glass assembly of claim 10, further comprising an interior trim covering an inner surface of the guide profile.

14. The vehicle window glass assembly of claim 13, wherein the fixed glass sheet further comprises an auxiliary portion fixedly connected to the fixed portion, the interior trim comprises a first trim portion and a second trim portion fixedly connected to the first trim portion, the first trim portion covers the inner surface of the guide profile, the second trim portion extends from one end of the first trim portion to an inner surface of the auxiliary portion, and the second trim portion partially covers the first side face and covers one end face of the first portion.

15. The vehicle window glass assembly of claim 1, wherein the guide profile further comprises a second side face opposite the first side face, the guide profile further defines a sliding groove, an opening of the sliding groove is on the second side face, and the sliding groove is used for arrangement of a movable glass sheet.

16. The vehicle window glass assembly of claim 1, wherein
the guide profile further comprises a second side face opposite the first side face, the guide profile further defines a sliding groove, an opening of the sliding groove is on the second side face, and the sliding groove is used for arrangement of a movable glass sheet; and
one end of the exterior trim, that is farther away from the sliding groove than the second side face, is in direct contact with each of the fixed glass sheet, the guide profile, and the connection member.

17. The vehicle window glass assembly of claim 1, wherein the exterior trim is flushed with the fixed glass sheet at a position where the exterior trim is in contact with the fixed glass sheet.

18. The vehicle window glass assembly of claim 1, wherein one end of the fixed glass sheet that extends through the connection member is in contact with the guide profile.

19. A vehicle, comprising a door frame and a vehicle window glass assembly mounted to the door frame, wherein
the vehicle window glass assembly comprises a guide profile, an exterior trim, a fixed glass sheet, and a connection member, wherein the guide profile has a first side face and defines a fixing groove, an opening of the fixing groove is on the first side face, the exterior trim covers an outer surface of the guide profile, the fixed glass sheet comprises a fixed portion at an edge of the fixed glass sheet, the fixed portion is received in the fixing groove, the connection member comprises a first portion received in the fixing groove, and the first portion is connected between a surface of the fixed portion and a groove wall of the fixing groove;
the exterior trim is made of a material, and the material has an elongation at break of greater than or equal to 10%; and
the exterior trim is in direct contact with each of the fixed glass sheet, the guide profile, and the connection member.

\* \* \* \* \*